Aug. 9, 1960     I. SISSELMAN ET AL     2,948,212
DISPOSABLE STRAINER CUPS FOR COFFEE PERCOLATORS
Filed Dec. 31, 1958

INVENTORS
Irving Sisselman
Jack Gallin
BY
ATTORNEY

United States Patent Office 2,948,212
Patented Aug. 9, 1960

2,948,212

DISPOSABLE STRAINER CUPS FOR COFFEE PERCOLATORS

Irving Sisselman, 9720 Kings Highway, Brooklyn, N.Y., and Jack Gallin, 18 Bluebell Lane, Babylon, N.Y.

Filed Dec. 31, 1958, Ser. No. 784,352

4 Claims. (Cl. 99—310)

This invention relates to the art of coffee brewing devices and particularly concerns a disposable strainer cup for holding coffee during the percolation process.

According to the invention there is provided a metal foil blank preformed with apertures and grooves so that it can readily be formed into a strainer cup of desired size for use in a percolator. The strainer cup thus formed holds the coffee grounds during the percolation process in a coffee percolator. After percolation is completed, the strainer cup and spent grounds are discarded. This avoids one of the most tedious and time consuming of daily household chores, namely the cleaning and scouring of a coffee percolator strainer cup. Since the strainer cup and coffee grounds are discarded after a single use, the user is assured that the coffee brewed will always taste fresh. Frequently when a conventional strainer cup has been improperly cleaned and insufficiently scoured, the resulting coffee brew tastes metallic and flat. The present invention insures that coffee as brewed in the home in a percolator pot is improved in flavor with less time and effort required to dispose of the coffee grounds and handle the strainer cup.

It is therefore a principal object of the invention to provide a coffee percolator cup strainer made of metal foil which is crushable and disposable after a single use.

It is a further object to provide a metal foil blank formed with apertures to serve as a strainer means, the blank being circular in form and adapted to be bent to form a strainer cup for containing coffee grounds and for fitting on a percolating tube of a coffee percolator.

It is a still further object to provide a disposable metal foil coffee percolator strainer cup with means adapting the cup to various sizes of coffee pots and various sizes of coffee percolating tubes.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 3:
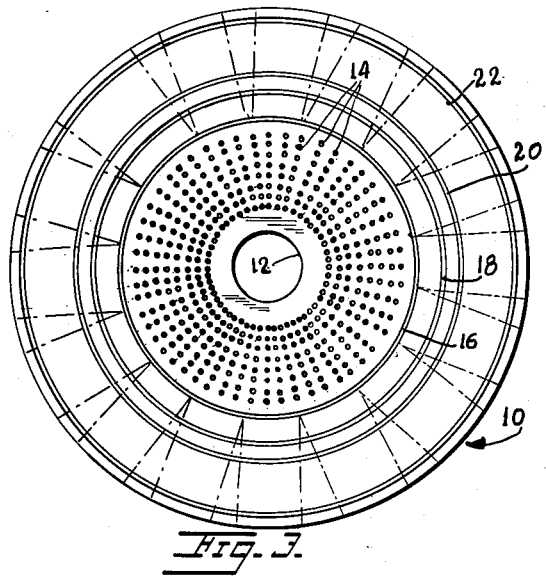
Fig. 3 is a plan view of a perforated foil blank useful in forming a disposable strainer cup.

Referring to Fig. 3, there is shown a blank 10 in the form of a circular metal foil disk. The metal may be aluminum, copper, brass, etc. The disk has a central hole 12. Surrounding the hole 12 are small holes 14 arranged in a plurality of concentric rings over an annular area of the disk. Just outside the ring having the largest diameter may be formed a groove 16 and if desired one or more concentric grooves 18 and 20. Near the periphery of the disk may be formed another circular groove 22. The grooves 16, 18 and 20 are intended to serve as guide means to facilitate bending the disk to form a cup of desired diameter. The groove 22 provides a means to facilitate rolling or bending the free edge of the disk to form a rolled edge.

Figure 2:
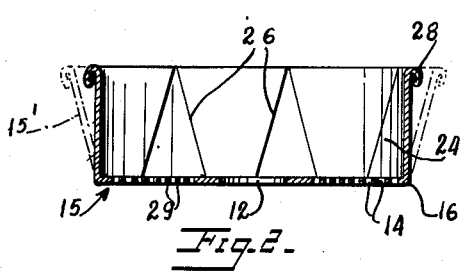
Fig. 2 is a central sectional view taken on line 2—2 of Fig. 1.
Figure 1:
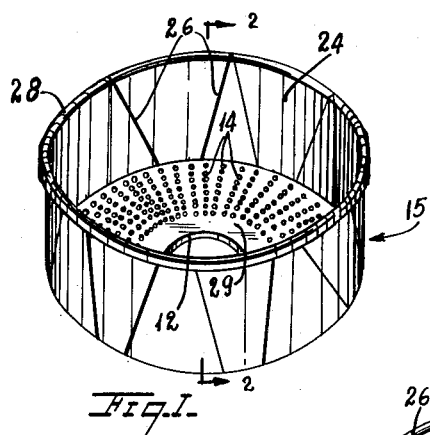
Fig. 1 is a perspective view of a strainer cup embodying the invention.
Figure 4:
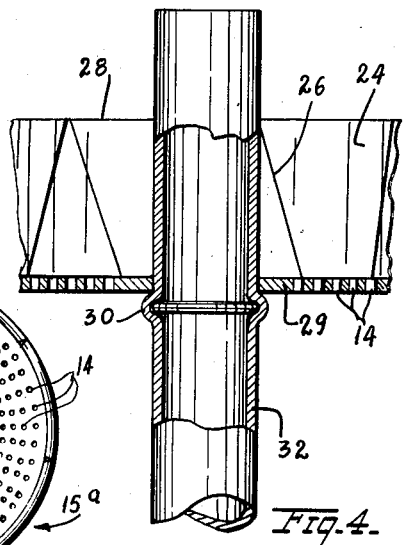
Fig. 4 is a longitudinal fragmentary sectional view on an enlarged scale of a portion of a strainer cup mounted on a percolator tube, parts being broken away.

Referring now to Figs. 1 and 2, there is shown one form of cup 15 which may be made from blank 10. The disk has been folded along groove 16 to provide an upstanding wall 24. In order to shape the blank to the cylindrical form of the wall, it is necessary to form the folds 26. These fold lines are indicated by dotted lines in Fig. 3. The folds serve as reinforcing ribs to strengthen the wall 24 in addition to shaping it to cylindrical form. The folds extend up to and over the top rim 28 of the cup. This rim is formed by folding along groove 22. The cup has a circular bottom 29 in which is the array of fine holes 14 which serves as the strainer for the cup. The central hole 12 of the cup is adapted to fit on the flange 30 of the percolator tube 32 as shown in Fig. 4.

Instead of folding the disk on groove 16 it could have been folded on one of grooves 18 or 20 to form a shallower cup of larger diameter. If desired, the user can press out with his thumb the unused one of grooves 16, 18 or 20, but this is not necessary since the unused grooves serve as reinforcement ribs in the cup body.

Figure 5:
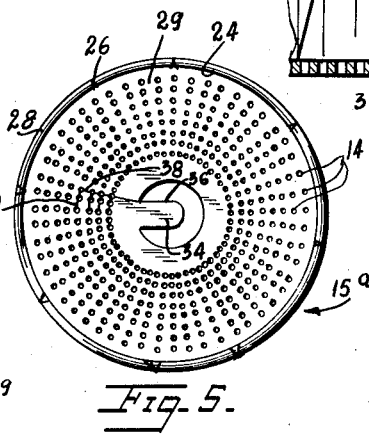

In Fig. 5, the cup 15a has been formed from a blank like that of Fig. 1, but there has been provided a radially inwardly extending tab 34. One edge 36 of the tab is aligned with cuts 38 connecting two or more of holes 14 in successive concentric rings immediately surrounding hole 12. In addition, circumferentially extending cuts 40 connect the holes immediately adjacent to the holes connected by cuts 38. There is thus provided a tear-out means so that the hole 12 can be enlarged to fit a tube 32 of any particular diameter. The serrated edge of the hole 12 produced by tearing out an annular strip of metal foil from the center of the cup is desirable since it serves as a toothed gripping means on the exterior of tube 32 at flange 30.

Figure 6:
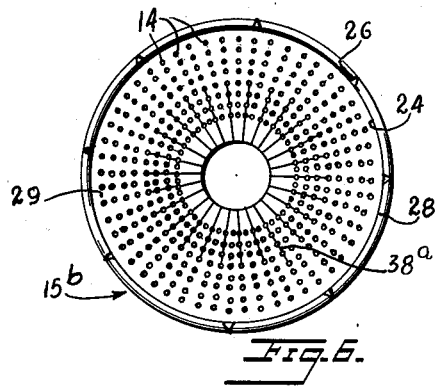
Figs. 5 and 6 are top plan views of other strainer cups embodying other forms of the invention.
Figure 7:
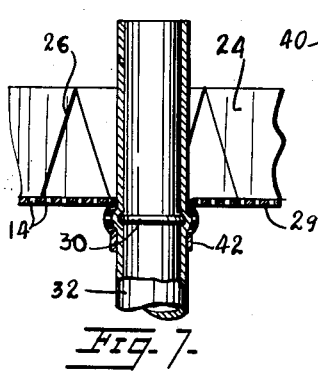
Fig. 7 is a fragmentary sectional view similar to Fig. 4 on a reduced scale of portions of another strainer cup and percolator tube.

In the form of the invention shown in Figs. 6 and 7 radial cuts 38a extend from hole 12 connecting aligned holes 14 in a succession of concentric rings of holes. These cuts permit the tongues 42 to be formed as shown in Fig. 7, so that the tube 32 can be gripped more effectively and the cup 15b held with its bottom perpendicular to the axis of the tube. As shown, these tongues overlay the flange 30 and extend down the sides of the tube. This arrangement is made by pushing the tube 32 downwardly or upwardly through hole 12. The center of the cup yields and opens to any size necessary depending on the diameter of the tube. After the tube is pushed downwardly or upwardly through hole 12 the tongues 42 are manually pressed inwardly around and over the flange 30 and the tube to provide in effect a cylindrical reinforcing sleeve underneath or above the bottom of the cup.

The assembled strainer cup and percolator tube will be used in the usual manner in a conventional coffee percolator pot. The ground coffee will be held in the cup while the hot water repeatedly passes up tube 32 and strains through the coffee and holes 14 in the percolation process. After the percolation is completed, the percolator tube 32 with the strainer cup thereon will be removed from the pot and the entire strainer cup with the spent coffee grounds therein can be removed from tube 32 and discarded without the necessity of washing the cup and handling the grounds separately as has been necessary heretofore. Since the cup is made of foil, it can be crushed around the coffee grounds to provide a convenient closed container. The holes 14 will permit excess water to drain out and will serve as ventilating means so that the coffee grounds dry up if they are not immediately discarded. This is a great convenience to the busy housekeeper who may not find it convenient to dispose of the discarded coffee grounds and strainer cup immediately. In any case, the housekeeper is saved the trouble of cleaning and scouring the strainer cup and separately disposing of the spent grounds.

The housekeeper can purchase a quantity of flat blanks and shape them as desired to form cups as shown in Figs. 4 or 7 or the manufacturer can supply the cups in folded form ready for use. If desired, the cups can be formed with a slight outward flare, as shown by dotted lines 15ᵃ in Fig. 2, so that a quantity of cups can be nested one within the other in a relatively small package.

The foil of the strainer cups should be somewhat stiff to contain the coffee grounds and percolating water without warping during use, but it should be thin enough to be readily molded to desired form before use and to be crushed around the grounds after use.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A percolator strainer cup, comprising a circular disk of metal foil folded to cup-shape form with a circular bottom portion and upstanding cylindrical wall, said wall having a rolled circular edge, said wall being formed with folds reinforcing the wall, said bottom portion having a central hole for fitting on a percolator tube and a plurality of fine strainer holes surrounding said central hole, said foil being stiff enough to retain coffee grounds and percolating water therein during use and being thin enough to be readily crushable by hand to enclose the spent grounds in the crushed cup, said bottom portion being formed with a tab extending radially inwardly at said central hole, said bottom portion having a first cut extending from the central hole and connecting radially spaced fine holes and a second cut extending circumferentially from said radially spaced fine holes to provide means whereby an annular strip of selected width may be torn from the center of said bottom portion to enlarge said central hole and provide a serrated edge therefor.

2. A percolator strainer cup, comprising a circular disk of metal foil folded to cup-shape form with a circular bottom portion and upstanding cylindrical wall, said wall having a rolled circular edge, said wall being formed with folds reinforcing the wall, said bottom portion having a central hole for fitting on a percolator tube and a plurality of fine strainer holes surrounding said central hole, said strainer holes being radially aligned, said foil being stiff enough to retain coffee grounds and percolating water therein during use and being thin enough to be readily crushable by hand to enclose the spent grounds in the crushed cup, said bottom portion being formed with a plurality of spaced cuts extending radially from said central hole through aligned strainer holes to form tongues in enlarging said central hole, said tongues being bendable to form a sleeve for gripping the flange of a percolator, said tube and supporting the bottom of the cup perpendicular to the axis of the tube, said tongues having roughened side edges to enhance the gripping qualities thereof.

3. As an article of manufacture, a blank for forming a percolator strainer cup, comprising a flat circular disk of metal foil, said disk having a central aperture for engaging on a flange of a percolator tube and a plurality of fine holes arranged in concentric rings around said central aperture for straining water therethrough, there being a plurality of concentric spaced grooves surrounding said fine holes to facilitate bending the disk to form a cup with an upstanding cylindrical wall with respect to the plane of the disk, there being a circular groove adjacent the outer edge of the disk to facilitate bending and rolling the edge to form a circular rim thereat, said spaced grooves providing ribs to reinforce the cup, said disk being further formed with a tab extending radially inwardly at said central aperture and with cuts adjacent said tab to facilitate tearing an annular strip from the disk for enlarging said central aperture and providing a serrated edge for said central aperture.

4. As an article of manufacture, a blank for forming a percolator strainer cup, comprising a flat circular disk of metal foil, said disk having a central aperture for engaging on a flange of a percolator tube and a plurality of fine holes arranged in concentric rings around said central aperture for straining water therethrough, said strainer holes being radially aligned, there being a plurality of concentric spaced grooves surrounding said fine holes to facilitate bending the disk to form a cup with an upstanding cylindrical wall with respect to the plane of the disk, there being a circular groove adjacent the outer edge of the disk to facilitate bending and rolling the edge to form a circular rim thereat, said spaced grooves providing ribs to reinforce the cup, said disk being further formed with cuts extending radially from said central aperture through aligned strainer holes to facilitate enlarging said central aperture and forming bendable tongues adapted to grip the flange of a percolator tube.

References Cited in the file of this patent

UNITED STATES PATENTS

| | | |
|---|---|---|
| 1,704,879 | Bridgham | Mar. 12, 1929 |
| 1,895,857 | Mockbee | Jan. 31, 1933 |
| 1,947,523 | Hirschhorn | Feb. 20, 1934 |
| 2,011,102 | Fisher et al. | Aug. 13, 1935 |
| 2,546,874 | Siegrist | Mar. 27, 1951 |
| 2,623,450 | Wier | Dec. 30, 1952 |
| 2,778,739 | Rodth | Jan. 22, 1957 |
| 2,822,273 | Anderson | Feb. 4, 1958 |
| 2,859,684 | Polizzi | Nov. 11, 1958 |

FOREIGN PATENTS

| | | |
|---|---|---|
| 757,358 | France | Oct. 9, 1933 |